Patented June 6, 1950

2,510,699

UNITED STATES PATENT OFFICE 2,510,699

2-CHLORO-2-(3-CYCLOHEXENYL)ETHYL DICHLOROPHOSPHINE

Elbert C. Ladd, Passaic, and Julian R. Little, Woodridge, N. J., assignors to United States Rubber Company, New York, N. Y., a corporation of New Jersey No Drawing. Application January 19, 1948, Serial No. 3,175

1 Claim. (Cl. 260—607)

Our invention relates to a new organic compound of phosphorus, 2-chloro-2-(3-cyclohexenyl)ethyl dichlorophosphine, and a method for its preparation. We have found that in the presence of a source of free radicals, phosphorus trichloride will react in a selective manner with one of the two olefinic linkages of 4-vinylcyclohexene to yield 2-chloro-2-(3-cyclohexenyl) ethyl dichlorophosphine as illustrated in (1) below:

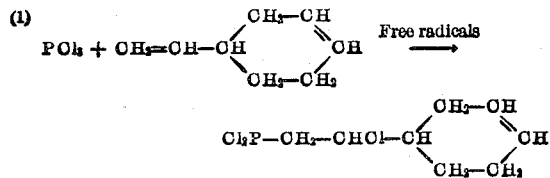

It is a distinctive feature of our invention that little or none of the reaction product of phosphorus trichloride with the olefinic linkage of the cyclohexenyl group is obtained in the above reaction.

The method of our invention entails heating 4-vinylcyclohexene with from 1 to 15 molar equivalents of phosphorus trichloride at 25–100° C. and for reaction times of from 1 to 24 hours. The reaction is promoted by any of the conventional sources of free radicals including peroxygen compounds such as benzoyl peroxide, but ultraviolet light is preferred not only because of its simplicity but also because its use tends to minimize the deleterious side reactions and decomposition frequently encountered when other sources of free radicals are employed.

The reaction product can be isolated and purified by fractional distillation of the reaction mixture.

The new compound of our invention is useful as a synthetic intermediate, being readily converted to 4-cyclohexenethenephosphonic acid by oxidation, e. g., with bromine, and hydrolysis, or to the corresponding esters by oxidation and subsequent treatment with the appropriate alcohol. Our new compound may likewise be employed as chemically modifying reactant with polymeric materials, particularly hydroxyl-containing polymers such as cellulose and polyvinyl alcohol.

The following example discloses our invention in more detail. All parts are by weight.

Example

A mixture of 51.5 parts of 4-vinylcyclohexene and 389 parts of phosphorus trichloride is irradiated by a source of ultraviolet light, namely, a Hanovia H-3 lamp equipped with a Corex-D glass cover which is permeable to ultraviolet radiation. The reaction is carried out for about 16 hours at 55° C. and the reaction mixture is then fractionally distilled to yield 20 parts of the liquid 2-chloro-2-(3-cyclohexenyl) ethyl dichlorophosphine, B. 99–102° C./1 mm.; $\eta_D^{20}$=1.5475; and containing by analysis 42.00% chlorine (theory, 43.31), and 12.68% phosphorus (theory, 12.63).

To a stirrer solution of 16 parts of the above compound in 310 parts of benzene are added 10.4 parts of bromine in 89 parts of benzene. Fourteen and one-tenth parts of p-cresol are then gradually added in the course of 0.5 hour. The reaction mixture is refluxed for 16 hours after which the benzene and p-cresol are removed by evaporation in vacuo leaving the pale yellow, viscous liquid di-p-tolyl 4-cyclohexenethenephosphonate containing by analysis 8.15% phosphorus (theory, 8.42%)—a new compound having the formula:

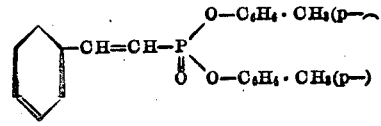

Having thus described our invention, what we claim and desire to protect by Letters Patent is:

2-chloro - 2 - (3 - cyclohexenyl)ethyl dichlorophosphine.

ELBERT C. LADD.
JULIAN R. LITTLE.

REFERENCES CITED

The following references are of record in the file of this patent:

UNITED STATES PATENTS

| Number | Name | Date |
|---|---|---|
| 2,163,180 | Ufer | June 20, 1939 |
| 2,425,766 | Toy | Aug. 19, 1947 |

OTHER REFERENCES

Kharasch et al., Jour. Am. Chem. Soc., vol. 67, pages 1864-5 (1945).